(12) United States Patent
Aftanas et al.

(10) Patent No.: US 7,198,184 B2
(45) Date of Patent: Apr. 3, 2007

(54) LOCKING MECHANISM FOR CROSS BAR OF A VEHICLE ARTICLE CARRIER

(75) Inventors: Jeffrey M. Aftanas, Ortonville, MI (US); Gordon E. Michie, Windsor (CA)

(73) Assignee: JAC Products, Saline, MI (US)

( * ) Notice: Subject to any disclaimer, the term of this patent is extended or adjusted under 35 U.S.C. 154(b) by 191 days.

(21) Appl. No.: 10/367,457

(22) Filed: Feb. 14, 2003

(65) Prior Publication Data

US 2003/0173385 A1 Sep. 18, 2003

Related U.S. Application Data

(60) Provisional application No. 60/364,177, filed on Mar. 13, 2002.

(51) Int. Cl.
*B60R 9/04* (2006.01)

(52) U.S. Cl. ............... 224/309; 224/321; 224/325; 224/326

(58) Field of Classification Search ............... 224/309, 224/315, 321, 322, 330, 331, 326, 325
See application file for complete search history.

(56) References Cited

U.S. PATENT DOCUMENTS

| | | | | |
|---|---|---|---|---|
| 4,469,261 A | * | 9/1984 | Stapleton et al. | 224/321 |
| 5,007,570 A | * | 4/1991 | Himmel | 224/321 |
| 5,203,483 A | * | 4/1993 | Cucheran | 224/321 |
| 5,326,007 A | * | 7/1994 | Pudney et al. | 224/321 |
| 5,385,285 A | * | 1/1995 | Cucheran et al. | 224/321 |
| 5,577,650 A | * | 11/1996 | Stapleton | 224/321 |
| 5,588,572 A | * | 12/1996 | Cronce et al. | 224/321 |
| 6,050,466 A | * | 4/2000 | Cronce et al. | 224/321 |
| 6,102,265 A | * | 8/2000 | Stapleton | 224/321 |

* cited by examiner

*Primary Examiner*—Tri M. Mai
(74) *Attorney, Agent, or Firm*—Harness, Dickey & Pierce, P.L.C.

(57) ABSTRACT

A vehicle article carrier having a cross bar which makes use of a pair of end supports for securing the cross bar to a pair of side rails. Each of the end supports includes an actuating member which is pivotally mounted to a housing of its associated end support. An inverted V-shaped biasing member is disposed within the housing and its outermost ends are captured within a first recess in the housing and a second recess formed in an internal wall of the actuating member. An over center action is employed to assist in biasing the actuating member into its unlocked and locked positions. The actuating member includes a locking post portion for engaging with one of a plurality of apertures formed along the length of its associated side rail. The end support can be constructed with a reduced number of independent component parts, thereby simplifying its construction and reducing its overall cost.

19 Claims, 3 Drawing Sheets

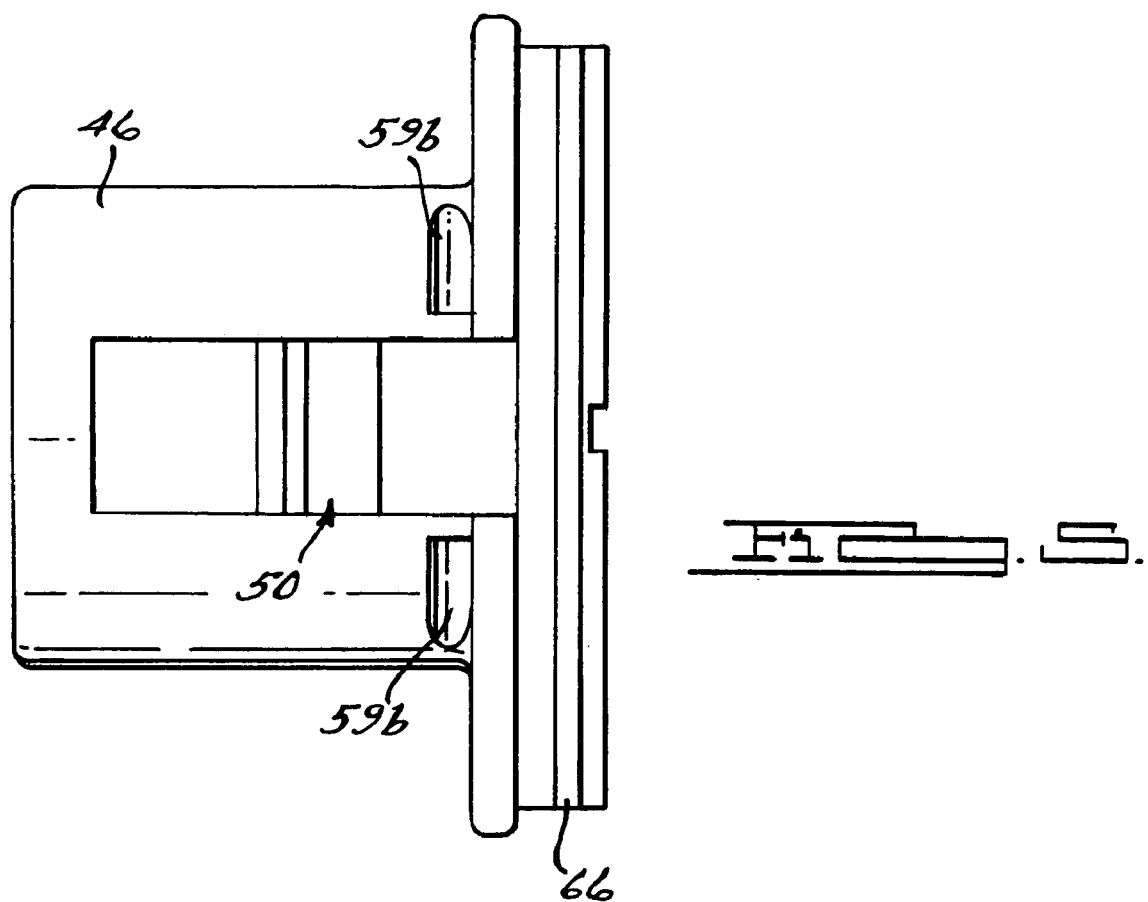

LOCKING MECHANISM FOR CROSS BAR OF A VEHICLE ARTICLE CARRIER

CROSS REFERENCED TO RELATED APPLICATIONS

This application claims priority from provisional application U.S. Ser. No. 60/364,177 filed Mar. 13, 2002, presently pending.

FIELD OF THE INVENTION

This invention relates to vehicle article carriers, and more particularly to a vehicle article carrier incorporating a cross bar having an end support at each end thereof, wherein each end support includes a spring biased locking mechanism.

BACKGROUND OF THE INVENTION

Vehicle article carriers are used in a wide variety of applications to support articles elevationally above an outer body surface of a vehicle. Typically, such vehicle article carriers include a pair of slats or elevated side rails which are each fixedly secured to the outer body surface of the vehicle in spaced apart relation to one another so as to extend generally parallel along a major longitudinal length of the vehicle. At least one crossbar, and more typically a pair of cross bars, are coupled between the slats or side rails. The cross bars are used to support articles thereon. Typically, at least one of the cross bars is adjustable so that it can be repositioned along the slats or side rails as needed to better support articles of various sizes.

It is highly desirable to provide a cross bar which has a locking mechanism at each end thereof which is easy for a user to engage and disengage. Put differently, it is desirable to provide a locking mechanism in which allows each end of the cross bar to be quickly and easily unlocked and locked to its associated slat or side rail by a user without the need for any external tools.

It is therefore a principal object of the present invention to provide a locking assembly suitable for use at each end of the cross bar of a vehicle article carrier, wherein the locking assembly has a mechanism which permits easy engagement and disengagement by a user without the need for any external tools, and which is highly resistant to interference from the elements. It is a further object of the present invention to provide such a locking mechanism which can be constructed relatively inexpensively and which does not increase the volume required at the end support of a cross bar.

SUMMARY OF THE INVENTION

The above and other objects are provided by a vehicle article carrier apparatus in accordance with preferred embodiments of the present invention. The vehicle article carrier apparatus includes a pair of support rails which are adapted to be secured to an outer body surface of the vehicle. At least one cross bar is incorporated which is securable at its outer opposite ends to each of the support rails. The cross bar includes an end support at each outermost end thereof which in turn includes a locking mechanism for enabling the end support to be easily locked and unlocked to its associated support rail.

In a preferred embodiment the locking mechanism comprises an actuating member which is pivotally mounted within a housing of the end support. The actuating member includes a recess or pocket formed in a wall thereof. An interior surface of the housing forms a second pocket or recess. An inverted V-shaped biasing member has its outermost ends positioned in the recess of the actuating lever and the recess in the housing and is installed under compression. The recess in the actuating member is further positioned slightly laterally of the pivot point of the actuating member such that an over center biasing action occurs when the actuating member is urged past a predetermined midpoint in its rotational travel. Thus, as the actuating lever is moved from an unlocked position to a locked position, the biasing member will cause the actuating member to be forced into locking engagement with its associated support rail once the travel of the actuating member passes the predetermined midpoint. Thereafter, the biasing force provided by the biasing member will hold the actuating member in its locked position.

When the actuating member is moved from a fully locked position toward an unlocked position, the biasing member urges the actuating member into its fully unlocked position as soon as rotational movement of the actuating member passes the predetermined midpoint.

The actuating member includes a locking post portion which is adapted to engage with one of a plurality of spaced apart openings formed in the support rail. In this manner, the end support associated with the locking mechanism can be fixedly secured at a predetermined longitudinal point along the support rail when the actuating member is in its locked position.

The locking mechanism has a reduced number of component parts, which help to improve reliability and less susceptibility to interference from dirt, ice and other elements which could conceivably affect operation of a more complicated locking system. Importantly, a reduced number of component parts of the locking mechanism reduces the overall cost of the vehicle article carrier.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a plan view of just the end support housing.

DETAILED DESCRIPTION OF THE PREFERRED EMBODIMENTS

The following description of the preferred embodiment(s) is merely exemplary in nature and is in no way intended to limit the invention, its application, or uses.

Figure 1:
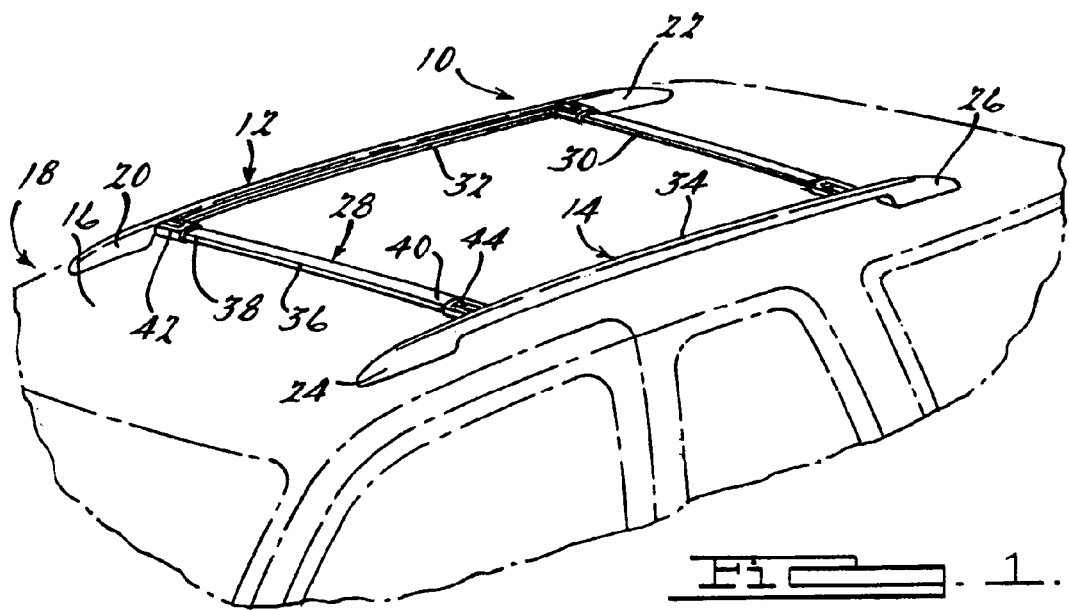
FIG. 1 is a perspective view of a vehicle article carrier in accordance with a preferred embodiment of the present invention fixedly secured to an outer body surface of a vehicle, wherein the vehicle is shown in phantom.

Referring to FIG. 1, there is shown a vehicle article carrier 10 in accordance with a preferred embodiment of the present invention. The vehicle article carrier 10 includes a pair of support rails represented as side rails 12 and 14 which are fixedly secured to an outer body surface 16 of a motor vehicle 18. The side rails 12 and 14 are further disposed generally parallel to one another and extend along a major longitudinal axis of the vehicle 18.

Side rail 12 is supported above the outer body surface 16 by a pair of supports 20 and 22. Side rail 14 is similarly supported above the outer body surface 16 by supports 24 and 26. Spanning the distance between the side rails 12 and 14 is a pair of cross bars 28 and 30. Typically, one of the cross bars 28, 30 is fixed relative to the side rails 12 and 14, while the other cross bar is movable along channels 32 and 34 formed in the side rails 12 and 14, respectively. In FIG. 1, however, both of these cross bars 28 and 30 are shown as being adjustable, which is strictly for illustrative purposes. The cross bars 28 and 30 are further illustrated as being identical in construction, and therefore only the construction and operation of front cross bar 28 will be described.

With further reference to FIG. 1, front cross bar 28 comprises a tubular cross bar component 36 having opposite ends 38 and 40. End supports 42 and 44 are secured to the outermost ends 38 and 40, respectively, to support the cross bar 28 from the side rails 12 and 14. The outermost ends 38 and 40 of the cross bar component 36 are secured to the end supports 42 and 44 in conventional fashion with conventional threaded fasteners or other suitable means. The end supports 42 and 44 are identical in construction.

Figure 4:
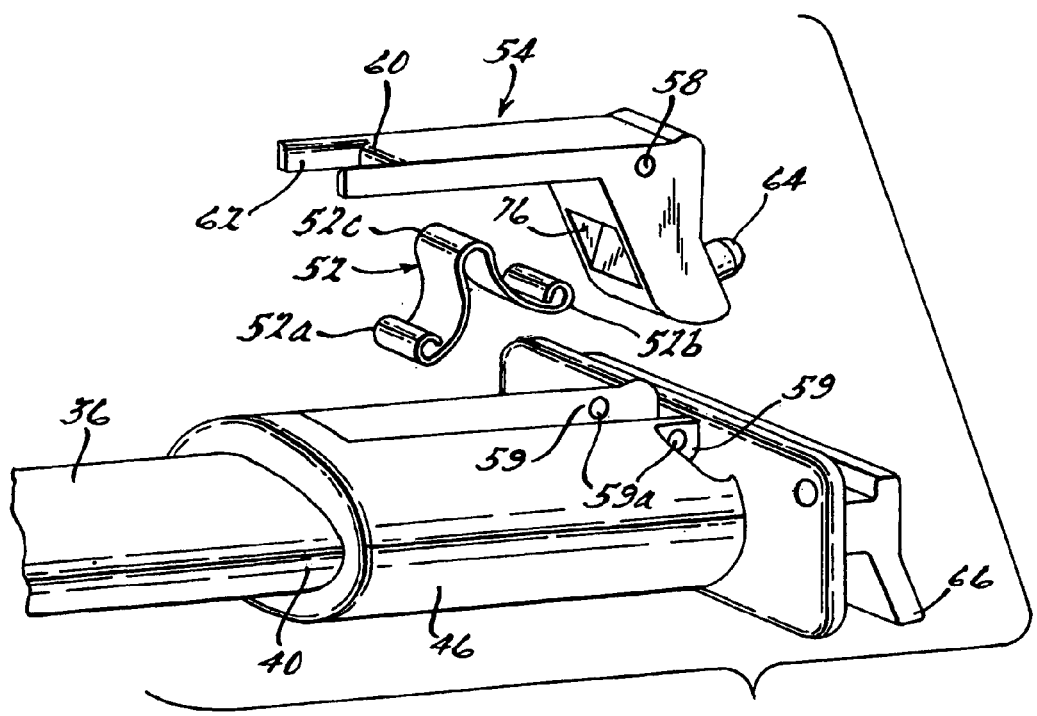
FIG. 4 is an exploded perspective view of the major components of the end support of FIG. 2.
Figure 2:
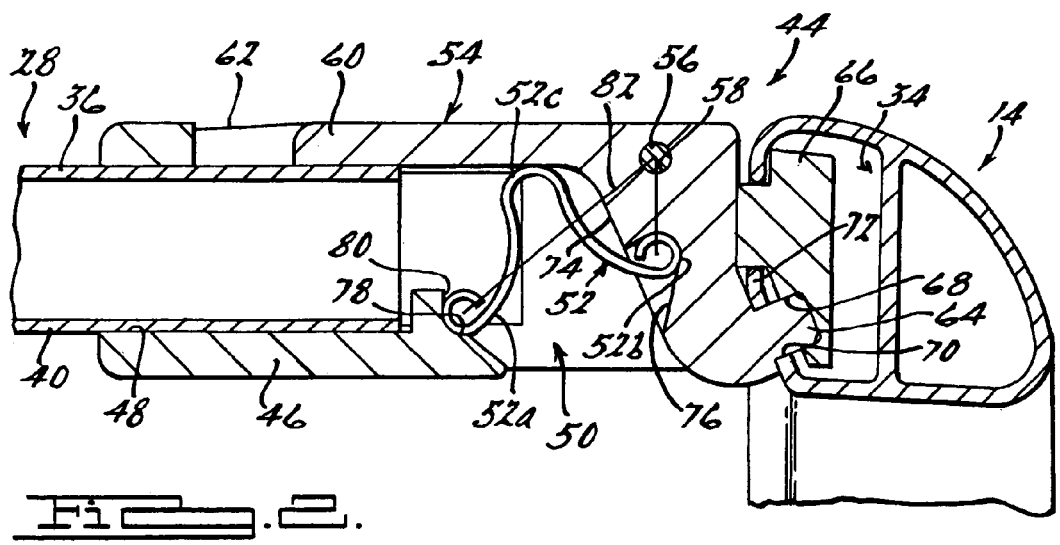
FIG. 2 is a side cross sectional view of one end support of the present invention, taken in accordance with section line 2—2 in FIG. 1, attached to its associated side rail and showing the actuating member thereof in the locked position.

Referring to FIG. 2, end support 44 will be described. End support 44 includes a housing 46 having a bore 48 and an opening 50. The outermost end 40 of the cross bar component 36 is inserted in the bore 48 and secured by suitable threaded fasteners or other means (not shown). Mounted within the opening 50 is a biasing member 52 having an inverted V-shape. An actuating member 54 is also mounted within the opening 50. The actuating member 54 is pivotably mounted to the housing 46 via a pivot pin 56 extending through a bore 58 and through portions 59 of the housing, as shown in FIG. 4, which each include apertures 59a. FIG. 5 illustrates scalloped areas 59b for permitting insertion of the pivot pin 56.

The actuating member 54 includes a graspable portion 60 having a cutout 62 which may be easily grasped by at least one finger of a user when the actuating member 54 is in its locked position as shown in FIG. 2. The actuating member 54 further includes a locking post portion 64 which is used to support and secure the end support 44 to its associated side rail 14. A T-lug of the housing 46 has a recess 68 in which the locking post portion 64 seats when the actuating member 54 is in its locked position.

To facilitate the above-described locking, the side rail 14 includes at least one, but more preferably a plurality, of spaced apart apertures 70 which can be engaged by the locking post portion 64. In this manner, the cross bar 28 can be repositioned at various points along the longitudinal length of the side rail 14 to better support variously sized articles thereon. The T-lug 66 serves to support the weight of the cross bar 28 on a lower edge 72 of the side rail 14. The shape of the T-lug 66 prevents the cross bar 28 from being inadvertently removed from the side rail 14.

Referring further to FIG. 2, a rear surface 74 of the actuating member 54 includes a recessed area 76. This is also shown in FIG. 4. Similarly, a recess or notch 78 is formed in an internal wall 80 of the housing 46 at a position which is longitudinally spaced apart from the recess 76. A first end 52a of the biasing member 52 is seated in the recess 78 while a second end 52b is seated in the recess 76. The biasing member 52 is installed with its first and second ends 52a and 52b, respectively, compressed slightly towards each other such that when the actuating member 54 is in its locked position shown in FIG. 2, the ends 52a and 52b will still be compressed slightly towards each other. In this manner, the locking member 54 will also be exerting a biasing force on the actuating member 54 to help keep the actuating member in its locked position when the locking post portion 64 is engaged within the recess 68.

With further reference to FIG. 2, the recesses 78 and 76 are further arranged, together with the shape of the biasing member 52, to provide an over center biasing action. An imaginary over center line is denoted by reference numeral 82 in FIG. 2.

Figure 3:
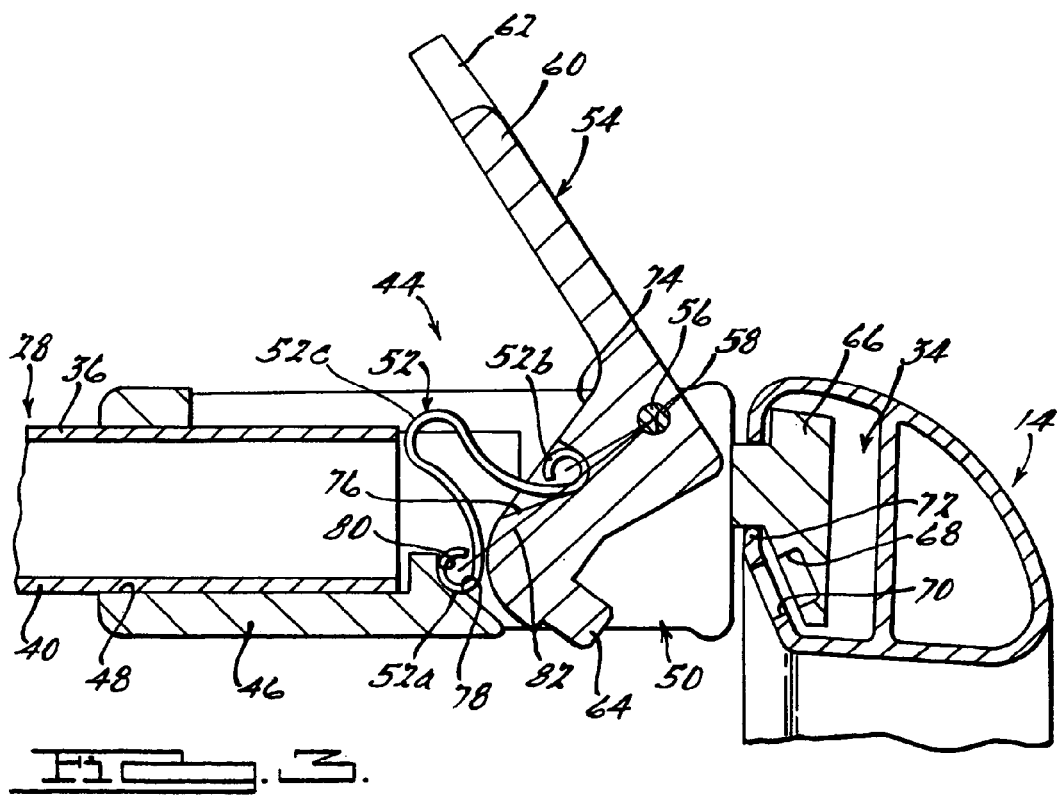
FIG. 3 is a view of the end support of FIG. 2 showing the actuating member in the unlocked position.

With reference to FIG. 3, the actuating member 54 is shown in its fully unlocked position. As can be seen, the end 52b of biasing member 52 has passed (i.e., is above) the imaginary over center line 82 and is thus exerting a biasing force on the actuating member 54 which tends to maintain the actuating member in the open position shown in FIG. 3. Since a vertex 52c of the biasing member 52 is free to move laterally inside the housing 46, as evident from FIGS. 2 and 3, between two spaced apart portions, the biasing member end 52b is able to be moved on opposite sides of the over center line 82. This enables the biasing member 52 to function to assist both opening and closing movement of the actuating member 54.

The over center locking action causes the actuating member 54 to "snap" open once the imaginary center line 82 is passed when the actuating member is moved from its fully closed position towards it open position. Similarly, the over center action causes the actuating member 54 to snap into its locked position when the actuating member is moved from its fully open position towards its locked position of FIG. 2.

The housing 46 and the actuating member 54 are both preferably made from a suitably high strength plastic. Biasing member 52 is preferably formed from spring steel. The locking post portion 64 could be reinforced with a metal insert or other object if additional strength is desired. The arrangement of the T-lug 66 with its recess 68 provides an excellent means for securing the locking post portion 64 and helping to prevent any "rattling" of the cross bar 28 when the vehicle 18 is traveling on bumpy surfaces or at high speeds. The T-lug is also shown in FIG. 5.

The end supports 42 and 44 thus form means for securely and conveniently affixing their associated cross bar 28 to the side rails 12 and 14. The end supports 42 and 44 are advantageously formed from a very small number of independent component parts which reduces the cost of manufacture of a vehicle article system incorporating the end supports 42 and 44.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles elevationally above an outer body surface, comprising:
 a pair of support rails adapted to be secured to said outer body surface at spaced apart locations on said outer body surface;
 at least one cross bar having end supports at each terminal end thereof for engaging said support rails and spanning a distance between said support rails, said cross bar being adapted to support said articles thereon;
 each said end support including:
 an internally disposed biasing member having a first and second spaced apart portions, and being supported within said housing for free rotational translating movement between two spaced apart positions within said housing;
 an actuating member pivotally mounted for pivotal movement between a locked position and an unlocked position;
 said first portion of said biasing member being disposed against an internal portion of said end support;
 said second portion of said biasing member being disposed against a portion of said actuating member, and relative to a pivot point of said actuating member, such that said biasing member provides an over center biasing action on said actuating member;
 wherein said over center biasing action enables said biasing member to automatically urge said actuating member into said locked position, relative to a respective one of said support rails, once said actuating member is moved past a predetermined point of travel when moving said actuating member toward said locked position; and
 wherein said over center biasing action enables said biasing member to automatically urge said actuating member into said unlocked position, relative to said respective one of said support rails, once said actuating member is moved past said predetermined point of travel when moving said actuating member toward said unlocked position, and to hold said actuating member in said unlocked position.

2. The vehicle article carrier of claim 1, wherein said biasing member comprises an inverted V-shaped spring.

3. The vehicle article carrier of claim 2, wherein said inverted V-shaped spring is comprised of spring steel.

4. The vehicle article carrier of claim 1, wherein:
 said housing comprises an opening;
 said actuating member being disposed within said opening when said actuating member is in said locked position.

5. The vehicle article carrier of claim 1, wherein said actuating member includes a graspable end portion adapted to be engaged with a finger of an individual to facilitate movement of said actuating member from said locked position toward said unlocked position.

6. The vehicle article carrier of claim 1, wherein:
 each said support rail includes a channel having an opening and a plurality of spaced apart apertures there along;
 said actuating member having locking post portion protruding there from;
 said housing includes a T-lug having a recess, said T-lug adapted to fit and slide within said channel of its respective said support rail; and
 said locking post portion adapted to extend through one of said apertures when aligned therewith and to engage said recess when said actuating member is urged into said locked position, thereby positively securing said housing along said respective support rail.

7. A vehicle article carrier for supporting articles elevationally above an outer body surface, comprising:
 a pair of support rails adapted to be secured to said outer body surface at spaced apart locations on said outer body surface;
 at least one cross bar having end supports at each terminal end thereof for engaging said support rails and spanning a distance between said support rails, said cross bar being adapted to support said articles thereon;
 each said end support including:
 a housing having an opening;
 a biasing member disposed within said housing and having first and second spaced apart portions;
 said biasing member being supported in said end support such that said biasing member is free to translate rotationally about one of said first and second spaced apart portions within said housing;
 an actuating member mounted for pivotal movement between a locked position and an unlocked position from said housing, and being disposed within said opening in said housing when in said locked position;
 said first portion of said biasing member being disposed against an internal portion of said end support;
 said second portion of said biasing member being disposed against a portion of said actuating member, and relative to a pivot point of said actuating member, such that said biasing member translates rotationally within said end support to provide an over center biasing action on said actuating member when said actuating member is rotated; and
 wherein said over center biasing action enables said biasing member to translate rotationally in a first direction to automatically urge said actuating member into said locked position, relative to a respective one of said support rails, once said actuating member is moved past a predetermined point of travel when moving said actuating member toward said locked position;
 wherein said over center biasing action enables said biasing member to translate rotationally in a second direction, opposite to said first direction, to automatically urge said actuating member into said unlocked position, relative to said respective one of said support rails, once said actuating member is moved past said predetermined point of travel when moving said actuating member toward said unlocked position, and to hold said actuating member in said unlocked position; and
 wherein said actuating member includes a locking portion adapted to engage said respective support rail when said actuating member is moved into said locked position.

8. The vehicle article carrier of claim 7, wherein:
 said locking portion of said actuating member comprises a locking post portion; and
 said respective support rail includes a plurality of apertures formed therein and spaced apart longitudinally there along; and
 said locking post portion extending through a selected one of said apertures in said respective support rail when aligned therewith, and when said actuating member is moved into said locked position.

9. The vehicle article carrier of claim 7, wherein said biasing member comprises an inverted V-shaped spring.

10. The vehicle article carrier of claim 7, wherein said biasing member is comprised of spring steel.

11. The vehicle article carrier of claim 7, wherein said actuating member comprises a cutout portion for enabling access with a finger of a user to allow said actuating member to be conveniently urged toward said unlocked position when said actuating member is positioned within said opening in said housing.

12. A method for securing an end support of a vehicle article carrier to a support rail, said method comprising:
   pivotally mounting an actuating member within a housing of said end support;
   disposing a biasing member within said housing such that a first portion of said biasing member is in contact with an internal portion of said housing, and a second portion of said biasing member is in contact with said actuating member, and further such that said biasing member is free to translate rotationally between two spaced apart locations within said housing;
   further disposing said biasing member within said housing such that one of said portions translates from one side of an imaginary line, wherein said imaginary line extends between a pivot axis of said actuating member and the other one of said portions, to an opposite side of said imaginary line, to thus provide an over center biasing action; and
   using said over center biasing action to assist in urging said actuating member between locked and unlocked positions relative to said support rail, and to hold said actuating member in said locked and unlocked positions.

13. An end support for securing a cross bar of a vehicle article carrier to a support rail, said end support comprising:
   a housing having an opening;
   an actuating member pivotally secured to said housing and pivotal about a pivot axis between locked and unlocked positions relative to said support rail;
   a biasing member disposed within said opening in said housing, said biasing member having a first portion engaging said housing and a second portion engaging said actuating member, said biasing member being supported to permit free rotational translating movement thereof between two spaced apart locations within said housing; and
   said biasing member further being arranged such that one of said portions translates from one side of an imaginary line, wherein said imaginary line extends between said pivot axis of said actuating member and the other one of said portions, to an opposite side of said imaginary line, to thus provide an over center biasing action to assist in moving said actuating member between said locked and unlocked positions.

14. The end support of claim 13, wherein said biasing member comprises an inverted V-shaped member.

15. The end support of claim 14, wherein said inverted V-shaped member is comprised of spring steel.

16. The end support of claim 14, said actuating member further comprising a locking post portion adapted to engage with said support rail to positively hold said end support at a desired position along said support rail.

17. The end support of claim 14, wherein said housing includes a T-lug portion for engaging a portion of said support rail and for supporting said housing from said support rail.

18. The end support of claim 14, wherein said actuating member includes a recess formed therein for receiving said second portion of said biasing member.

19. The end support of claim 14, wherein said housing includes a recess for engaging with said first portion of said biasing member.

* * * * *